April 1, 1941. C. O. COZZENS 2,236,565
OPHTHALMIC MOUNTING
Filed Jan. 24, 1939
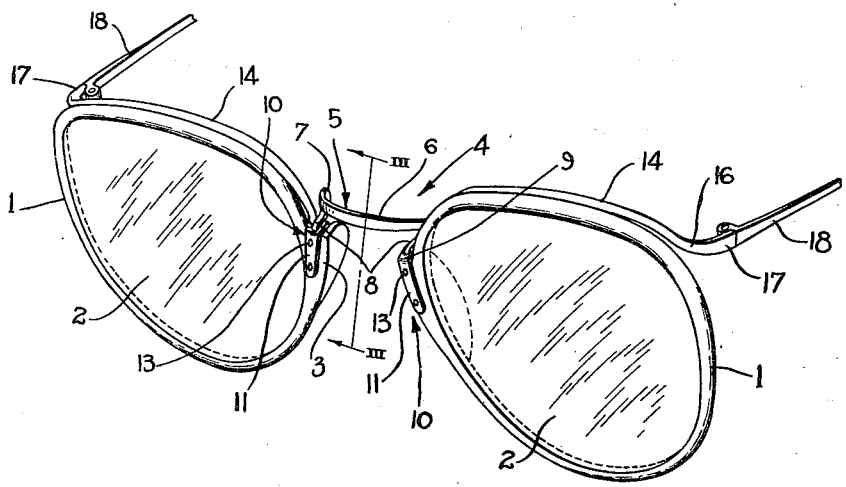
Fig. I
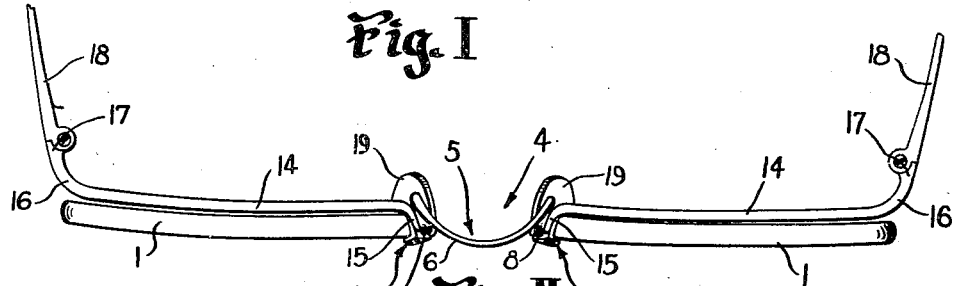
Fig. II
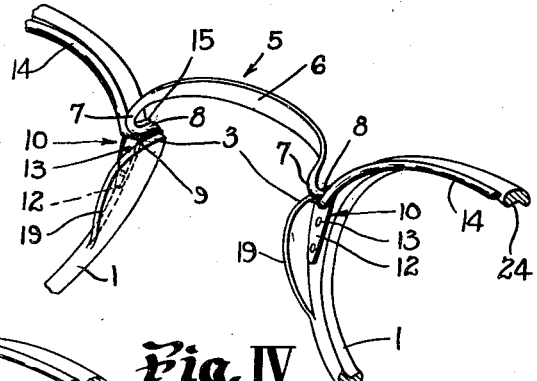
Fig. IV
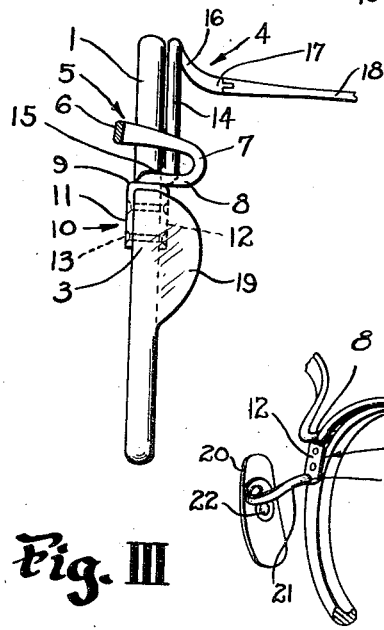
Fig. III  Fig. V
INVENTOR.
CHARLES O. COZZENS
BY Harry H. Styll
ATTORNEY.

Patented Apr. 1, 1941

2,236,565

UNITED STATES PATENT OFFICE 2,236,565

OPHTHALMIC MOUNTING

Charles O. Cozzens, Southbridge, Mass., assignor to American Optical Company, Southbridge, Mass., a voluntary association of Massachusetts Application January 24, 1939, Serial No. 252,609

2 Claims. (Cl. 88—47)

This invention relates to improvements in ophthalmic mountings and has particular reference to an improved spectacle type mounting.

One of the principal objects of the invention is to provide an ophthalmic mounting of the spectacle type having relatively continuous lens supporting rims about the contour edges of the lenses and a supporting structure constituting an adjustable bridge member for connecting said rims and relatively long and slender adjustable temple supports generally shaped to follow the upper contour shape of the rims, said supporting structure providing means whereby the lenses may be adjusted to different spaced relations with each other to accommodate for changes in the interpupillary distances of different individuals and means whereby the temples, etc., may be adjusted to meet the facial requirements of said individuals independently of the supporting rims.

Another object is to provide an ophthalmic mounting having continuous non-metallic lens rims fitting about the contour edges of the lenses and an adjustable supporting structure for said lens rims so arranged that the non-metallic lens rims may be expanded for the insertion or removal of lenses of different contour shapes and sizes without changing the positional relation of the parts of the supporting structure, and so that the said structure may be adjusted independently of the lens rims to fit the facial requirements of the wearer.

Another object is to provide an ophthalmic mounting of the type having non-metallic lens holding means whereby the contour of said lens holding means is smooth and continuous and the usual horn type temple supporting projections of most prior art mountings of this nature are dispensed with.

Another object is to provide an ophthalmic mounting of the type having continuous lens rims formed of expandable and contractable material in combination with a supporting structure so arranged that lenses may be snapped into said lens rims without disturbing the relation of the remainder of the parts of said mounting and the supporting structure may be adjusted to the facial requirements of the wearer without altering the relation of said lens rims.

Another object is to provide an ophthalmic mounting having immediate face engaging portions formed of non-metallic material in combination with a metallic supporting structure, said supporting structure being of a relatively rigid or resilient nature or having portions thereof formed relatively rigid and pliable in combination with other portions having resilient characteristics.

Other objects and advantages will become apparent from the following description taken in conjunction with the accompanying drawing and it will be apparent that many changes in the details of construction and arrangement of parts described may be made without departing from the spirit of the invention as expressed in the accompanying claims. I, therefore, do not wish to be limited to the exact details of construction and arrangement of parts herein set forth as the preferred form only has been given by way of illustration.

Referring to the drawing:

Fig. I is a front perspective view of an ophthalmic mounting embodying the invention;

Fig. II is a top plan view of the mounting shown in Fig. I;

Fig. III is an enlarged sectional view taken as on line III—III of Fig. I;

Fig. IV is a fragmentary rear perspective view of the central main supporting portions of the mountings; and Fig. V is a partial view similar to Fig. IV of a modified form of the invention.

In ophthalmic mountings it is desirable that the various parts be in desired positional relation with each other and yet be so constructed that various different adjustments may be made to fit such mountings to the varied facial characteristics of different individuals. It is also desirable to use lenses of different sizes and contour shapes and to provide adjustments to compensate for variations in the distances between the eyes of the wearer, different distances between the temples, angle of temples, upper contour shapes of lenses and different sizes of lenses whereby the parts may be adjusted to the wearer and to desired positional relation with each other.

In ophthalmic mountings of the type having non-metallic lens rims which, in the past, were adapted to be expanded to receive lenses of different contour shapes and sizes and to retain them in position by contraction after the said lenses had been snapped in the lens rims, it has been usual, in order to provide means for the attachment of temples, to provide an integral projecting lug on the rims. In many instances the bridge members were also formed integral and of the same material as the lens rims. Such ophthalmic mountings, although desirable from the standpoint of being self-accommodating to lenses of different contour shapes and sizes, could not be adjusted to compensate for variations in distances between the eyes of different individuals, varying distances between the temples, angles of temples, and so forth.

It, therefore, is one of the principal objects of this invention to provide an ophthalmic mounting and process of making, assembling and fitting the same whereby the lens rims may be readily sized and shaped to receive lenses of different sizes and contour shapes without disturbing the positional relation of the supporting parts of the mounting and the said supporting parts may be adjusted to alter the distance between the lens holding means, to vary the distance between the temples, angle of temples and to position the parts in desired assembled relation with each other and in which the requirements of integrally projecting lugs on the contour edges of the lens rims for attachment of the temples is obviated.

Referring to the drawing wherein like characters of reference designate like parts throughout the several views the ophthalmic mounting embodying the invention comprises a pair of lens rims 1 shaped to fit about the contour edges of the lenses 2. The said lens rims 1 may be formed of any desirable material but, in this particular instance, are preferably formed of non-metallic material having expandable and contractable characteristics, and are preferably continuous so that they must be expanded to receive the lenses. The said lens rims 1, as shown in Figs. I to IV inclusive, are provided adjacent the nasal sides thereof, with an integral lug 3 to which the supporting structure 4 of the mounting may be attached.

The supporting structure is preferably formed of metallic material and constitutes a bridge member 5 having a central arch portion 6 curving rearwardly to loop portions 7 terminating in forwardly extending shank portions 8. The shank portions 8 are secured to the upper surface 9 of a bifurcated member 10 having its spaced branches 11 and 12 engaging the opposed front and rear surfaces of the lugs and secured to said lugs by rivets or the like 13. The shank portions 8 may be secured to the upper edge portions of the bifurcated members 10 by soldering, welding or the like. The bifurcated members 10 also provide attaching means for the relatively long and slender temple supporting portions 14 of the main supporting structure of the mounting. The said portions 14 are shaped substantially to follow the upper contour edges of the lenses or lens rims, preferably in a plane in the rear of said upper portions of the lens rims, with the upper edges of said relatively long and slender temple supports substantially flush with the contour edge surfaces of said lens rims. The said temple supports 14 each have a deflected foot portion 15 secured to the upper surface 9 of the members 10 and adjacent the forwardly extending portions 8 of the bridge member 5 by soldering welding or the like. The opposed ends of said relatively long and slender temple supports curve downwardly and rearwardly, as illustrated at 16, and terminate in end portions 17 to which the temples 18 are pivotally attached. The central arch portion 6 of the bridge 5 may be formed rigid or resilient, as desired, or may possess one or more of said characteristics, that is, the immediate central portion 6 may be formed relatively resilient and the loop portions and forwardly extending shanks 7 and 8 may be formed relatively rigid and pliable, as desired.

The relatively long and slender temple supports may be formed relatively rigid, ductile and pliable or resilient, or may have portions thereof possessing one or more of said characteristics as desired. Although the said relatively long and slender temple supports are described as being positioned preferably in the rear of the plane of the lenses or in the rear of the upper contour portions of said lens rims 1, said temple supports may be positioned in the plane of said lens rims or forwardly thereof or shaped substantially to the upper contour shape of said lens rims, as desired. The lugs 3 to which the bifurcated members 10 are secured have integrally and rearwardly projecting nose bearing pads 19 thereon.

The said mounting may be provided, however, with separately adjustable bearing pads 20. In this particular instance the pads 20 may be formed of non-metallic or metallic material, as desired, and may be pivotally connected to adjustable arm members 21, as illustrated at 22. The said arms 21 may be attached to the rear branch 12 of the bifurcated members 10, as illustrated at 23. Said connection may be formed by soldering or welding, as desired.

The lens rims 1 are preferably formed of cellulose compositions, artificial resins, or other materials having expandable and contractable characteristics. In completing the mounting, the lenses 2, having the prescriptive characteristics desired of the particular individual, are provided with the size and contour shape desired. The lens rims 1 are subjected to heat to soften the material thereof sufficient to enable the said rims to be stretched; are then stretched and simultaneously shaped substantially to the contour shape of the lenses and to a size sufficient to enable the said lenses to be snapped in the V-shaped continuous grooves 24 internally of each of said lens rims. It is to be understood that the said lenses 2 are provided with bevelled contour edges of such shape as to fit within the V-grooves 24 of the lens rims. After the lenses have been snapped within the grooves of the lens rims 1 and have been positioned in desired relation with said rims, the said rims are subjected to a lower temperature whereby they will contract and retain the lenses in their internal groove.

It is particularly pointed out that this stretching and sizing of the lens rims and the insertion of the lenses 2 therein, in this particular instance, may be accomplished independently of the remaining supporting structure of the mounting. Such rims are desirable as they afford protection of the lenses and obviate the necessity of forming attaching openings in said lenses, as is usual with rimless type mountings. The said rims also provide means to which the remaining supporting structure of the mounting may be readily attached and thereby affords positive support for the lenses with substantially little, if any, strain on said lenses.

The supporting structure, in this particular instance, constitutes the central bridge member 5, relatively long and slender temple supports 14, and temples 18 which may be adjusted to fit the facial requirements of the wearer to adjust the centers of the lenses, as required by the distance between the pupils of the eyes of the wearer, and to locate the various parts of the mounting in desired positional relation with each other. The various adjustments mentioned above, including the adjustment of the distance between the temples, angle of temples and so forth, may be made without disturbing the relation of the remaining parts of the mounting and provide a relatively wide range of adjustment so that a single mounting may be adjusted to the requirement of several different individuals.

The mounting, illustrated in Figs. I to IV inclusive, has its immediate face contacting portions formed of non-metallic material and provides exceptionally comfortable wide area contact with the face, particularly adjacent the nose of the wearer. Such non-metallic materials are resistant to corrosion, acid attack and perspiration, they are light in weight and neat in appearance.

The temple supporting means 14 are so related with the lens rims 1 that they are substantially inconspicuous when on the face and when the mounting is viewed from the front.

The general arrangement set forth above not only provides adjustments hitherto not obtainable in non-metallic type mountings but also provides a mounting which is very neat and desirable from the aesthetical view point. It is particularly pointed out that the outer contour edges of the lens rims do not have the usual horn like projections of prior art mountings of this nature.

The adjustment for changing the distance between the center of the lenses is accomplished by bending the shank portions 8 sidewise with the bend taking place substantially at the loop portions 7. Part of said adjustment may be made by forming the curve of the central arch portion 6 more shallow or more arcuate as desired.

The temples 18 may be adjusted to increase or decrease the distance therebetween to meet the requirements of different widths of faces by bending the rearwardly extending portions 16 inwardly or outwardly. The temples may also be angled relative to the plane of the lenses by bending the said temple extending portions 16 upwardly or downwardly. The portions 14, while providing means for supporting the said temples independently of the lens rims affords a wide range of adjustment to position the temples in desired relation with lenses of different contour shapes and sizes. It is to be borne in mind that in adjusting the said relatively long and slender portions 16 care is taken that they substantially follow the upper contour shape of the lenses and preferably lie in a plane in the rear of said lens rims.

From the foregoing description it will be seen that a novel ophthalmic mounting and process of assembling and fitting the said mounting to the requirements of different individuals has been provided whereby all of the objects and advantages of the invention are attained. It is particularly pointed out that all of the metallic parts of the mounting are preferably secured in assembled relation with each other prior to being attached to the non-metallic portions and that the said adjustments are made after all of the parts of the mounting are secured in assembled relation with each other.

Having described my invention, I claim:

1. In an ophthalmic mounting a pair of non-metallic lens rims each formed as a continuous unbroken ring having an attachment enlargement on the nasal side thereof with a relatively small and substantially uniform cross-section throughout the remainder of its extent with an uninterrupted substantially continuous outer surface on the temporal side thereof and being accordingly adapted to be heated and stretched to permit the insertion or removal of a lens and thereafter allowed to cool to return to its initial set and an adjustable metallic supporting assembly for said non-metallic lens rims, said assembly comprising a bridge member having a central arch portion curving rearwardly to bendable loops which terminate in forwardly extending portions, plate like members having a portion shaped to overlie a side surface of the attachment enlargements and a portion shaped to overlie the top surface of said enlargements, means to secure the plate-like members to the enlargements, said forwardly extending portions of the bridge having a side surface secured to the portion of the plate-like members overlying the top of the attachment enlargements, relatively long and slender bendable temple supports attached to the assembly and progressing outwardly of said plate-like members and shaped substantially to the upper contour shape of the lens rims and terminating in temple hinge connections, said bridge member being adjustable by bending to support the lens rims in desired spaced aligned relation with each other and said long and slender temple supports being adjustable by bending to follow substantially the upper contour shape of the lens rims and to support temples in desired spaced relation with each other and in desired angular relation with respect to the lens rims, said temple supports being adjustable without altering the spaced aligned relation of the lens rims.

2. In an ophthalmic mounting a pair of non-metallic lens rims each formed as a continuous unbroken ring having an attachment enlargement on the nasal side thereof with a relatively small and substantially uniform cross-section throughout the remainder of its extent with an uninterrupted substantially continuous outer surface on the temporal side thereof and with a rearwardly extending integral nose bearing member adjacent said enlargement, and a metallic supporting assembly for said non-metallic lens rims comprising means in the form of rivet-like means extending within the material of the attachment enlargement and interconnected with plate-like means overlying a side surface of said attachment enlargements and having relatively long and slender bendable temple supports attached to the assembly and progressing outwardly from adjacent said plate-like means and shaped substantially to the upper contour of the lens rims and terminating in temple connections, a bendable bridge member having portions interconnected with each of said attachment enlargements by said rivet-like means shaped to support the lens rims in desired spaced aligned relation with each other, said plate-like means overlying the side surface of the attachment enlargement having a portion extending downwardly behind the integral rearwardly extending nose bearing members, said metallic supporting assembly being so related with the non-metallic lens rims that the said temple supports may be adjusted by bending without altering the spaced aligned relation of the lens rims and said lens rims are free to be heated and expanded for the insertion or removal of a lens independently of said supporting assembly and without altering the adjusted relation of said assembly.

CHARLES O. COZZENS.